(12) United States Patent
King et al.

(10) Patent No.: US 6,326,763 B1
(45) Date of Patent: Dec. 4, 2001

(54) SYSTEM FOR CONTROLLING POWER FLOW IN A POWER BUS GENERALLY POWERED FROM REFORMER-BASED FUEL CELLS

(75) Inventors: Robert Dean King, Schenectady; Gautam Sinha, Albany, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/467,328

(22) Filed: Dec. 20, 1999

(51) Int. Cl.[7] .................................................. H01M 10/46
(52) U.S. Cl. ................................................... 320/101
(58) Field of Search ........................... 320/101, 132, 320/149, DIG. 21; 429/12, 13

(56) References Cited

U.S. PATENT DOCUMENTS 5,903,449    5/1999   Garrigan et al. .
5,905,360  * 5/1999   Ukita ........................................ 320/118
6,011,379  * 1/2000   Singh et al. ............................ 320/132

* cited by examiner

Primary Examiner—Edward H. Tso

(57) ABSTRACT

A control system for controlling power flow in a power bus generally powered by a reformer-based fuel cell system (FCS) is provided. The control system comprises an energy storage device (ESD); a power interface unit coupled to selectively and bi-directionally pass power between the energy storage device and the power bus; and a controller coupled to the power bus to receive one or more signals indicative of the instantaneous power delivered by the fuel cell system. The controller may be configured so that the energy storage device may supply power to the power bus at least during transient conditions when the instantaneous power delivered by the fuel cell system drops below a (FCS) power command signal.

47 Claims, 3 Drawing Sheets

US 6,326,763 B1

SYSTEM FOR CONTROLLING POWER FLOW IN A POWER BUS GENERALLY POWERED FROM REFORMER-BASED FUEL CELLS

BACKGROUND OF THE INVENTION

The present invention is generally related to control techniques used in power systems and, more particularly, is related to a power system and control techniques that may be used in combination with reformer-based fuel cells so as to utilize the advantages of such fuel cells while overcoming undesirable transient response characteristics the reformer-based fuel cell may have.

It is known that standard fuel cell stacks that operate directly from a predetermined chemical fuel, e.g., hydrogen fuel, in combination with a predetermined oxidant, e.g., oxygen, provide power response that is sufficient for propelling vehicles, including passenger cars, trucks, and transit buses. It is believed several prototype fuel cell transit buses using hydrogen or other fuels may be in pilot operation in the United States. Various factors, such as safety, governmental regulations, infrastructure and packaging constraints, etc., are forcing other alternatives to direct hydrogen-powered fuel cells for transportation applications. Reformer technology is currently being developed and used to produce hydrogen fuel from alternate fuels, including methanol, gasoline, etc.

When hydrogen produced by a reformer is used to power the fuel cell stacks, unfortunately, the transient power response of the overall system that powers one or more traction motors in the vehicle is typically several seconds or possibly ten seconds or more. Thus, presently available reformer-based fuel cell systems will typically have a severe transient response performance degradation, making such systems unacceptable for transportation applications, power distribution devices, hoisting applications, etc. Further, as in a standard gasoline or diesel engine internal combustion engine (ICE), the standard fuel cell stack and reformer system provides a unidirectional source of power during the process of consuming fuel, and cannot operate in the reverse direction, i.e. accept power and regenerate the chemical fuel during periods of vehicle deceleration. Thus, any energy regenerated by the traction motors during such periods of deceleration would generally be dissipated and wasted.

Thus it is desirable to provide techniques that would allow for a highly efficient power control system that using a suitable energy storage device would solve the undesirable slow transient power response of standard fuel cells operating with a reformer. It would be further desirable to provide techniques that would allow for recovering or capturing in the energy storage device energy that may be generated during periods of deceleration, e.g., when the traction motors in the vehicle act as generators of electricity, as opposed to generators of mechanical power.

BRIEF SUMMARY OF THE INVENTION

Generally speaking, the present invention fulfills the foregoing needs by providing a control system for controlling power flow in a power bus generally powered by a reformer-based fuel cell system (FCS). The control system comprises an energy storage device (ESD); a power interface unit coupled to selectively pass power bi-directionally between the energy storage device and the power bus in response to an ESD power command signal supplied to the power interface unit; and a controller coupled to the power bus to receive one or more signals indicative of the instantaneous power delivered by the fuel cell system. The controller may be configured to generate the ESD power command signal so that the energy storage device may supply power to the power bus at least during transient conditions when the instantaneous power delivered by the fuel cell system drops below a FCS power command signal.

The present invention further fulfills the foregoing needs by providing an auxiliary power system in combination with a reformer-based fuel cell system (FCS) for energizing a power bus coupled to one or more traction motor drives generally used for propelling a vehicle or hoisting objects, etc. . The power system comprises an energy storage device (ESD); a power interface unit coupled to selectively pass power between the energy storage device and the power bus in response to an ESD power command signal supplied to the power interface unit; and a controller coupled to the power bus to receive one or more signals indicative of the instantaneous power delivered by the fuel cell system and configured to generate the ESD power command signal so that the energy storage device may supply power to the power bus at least during transient conditions when the instantaneous power delivered by the fuel cell system drops below a FCS power command signal.

The present invention additionally fulfills the foregoing needs by providing a method for controlling power flow in a power bus generally powered by a reformer-based fuel cell system (FCS). The method allows for providing an energy storage device (ESD). The method further allows for selectively passing power bi-directionally between the energy storage device and the power bus in response to an ESD power command signal. The method also allows for determining the instantaneous power delivered by the fuel cell system so that the energy storage device may supply power to the power bus at least during transient conditions when the instantaneous power delivered by the fuel cell system is below a FCS power command signal.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
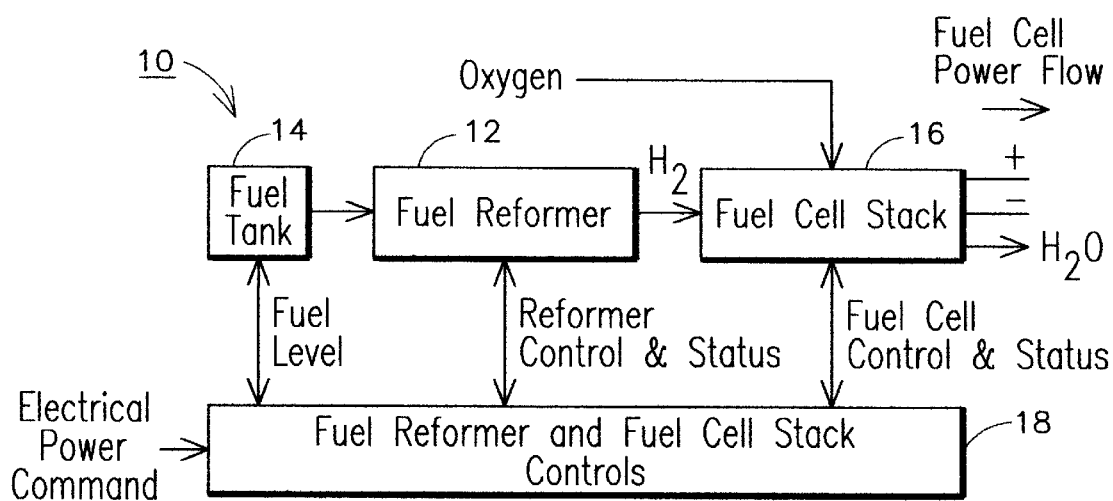
FIG. 1 is a block diagram schematic of an exemplary reformer-based fuel cell system that may benefit from the teachings of the present invention.

A top level block diagram of a reformer-based standard fuel cell system (FCS) 10 operating from hydrogen fuel processed in a fuel reformer 12 is shown in FIG. 1. The reformer 12 receives a suitable chemical fuel, other than hydrogen, e.g., methanol, natural gas, gasoline, etc., from a fuel tank 14. The reformer converts the received fuel into hydrogen which in turn is used to as the source of fuel for a stack of fuel cells 16. A fuel cell/reformer controller 18 is used for generating suitable control signals in response to an externally-derived electrical power command signal. By way of example, in a vehicle, the power command signal may correspond to an acceleration command signal. As will be appreciated by those of ordinary skill in the art, the fuel cell/reformer system 10 will contain the standard hardware, i.e. pumps, valves, sensors, and necessary control functions required to make the entire system operate, however, any such details which are well-known to those of ordinary skill in the art and are not relevant for the purposes of the present invention will not be discussed in any greater detail. Optimal efficiency of this conventional fuel cell system generally occurs at light load, approximately 25% of the maximum rated power. As suggested above, the fuel cell stack and reformer system provides a unidirectional source of power during the process of consuming fuel, and cannot operate in the reverse direction, i.e. accept power and regenerate any fuel, e.g., hydrocarbon-based fuel or hydrogen, during periods of vehicle deceleration.

Figure 2:
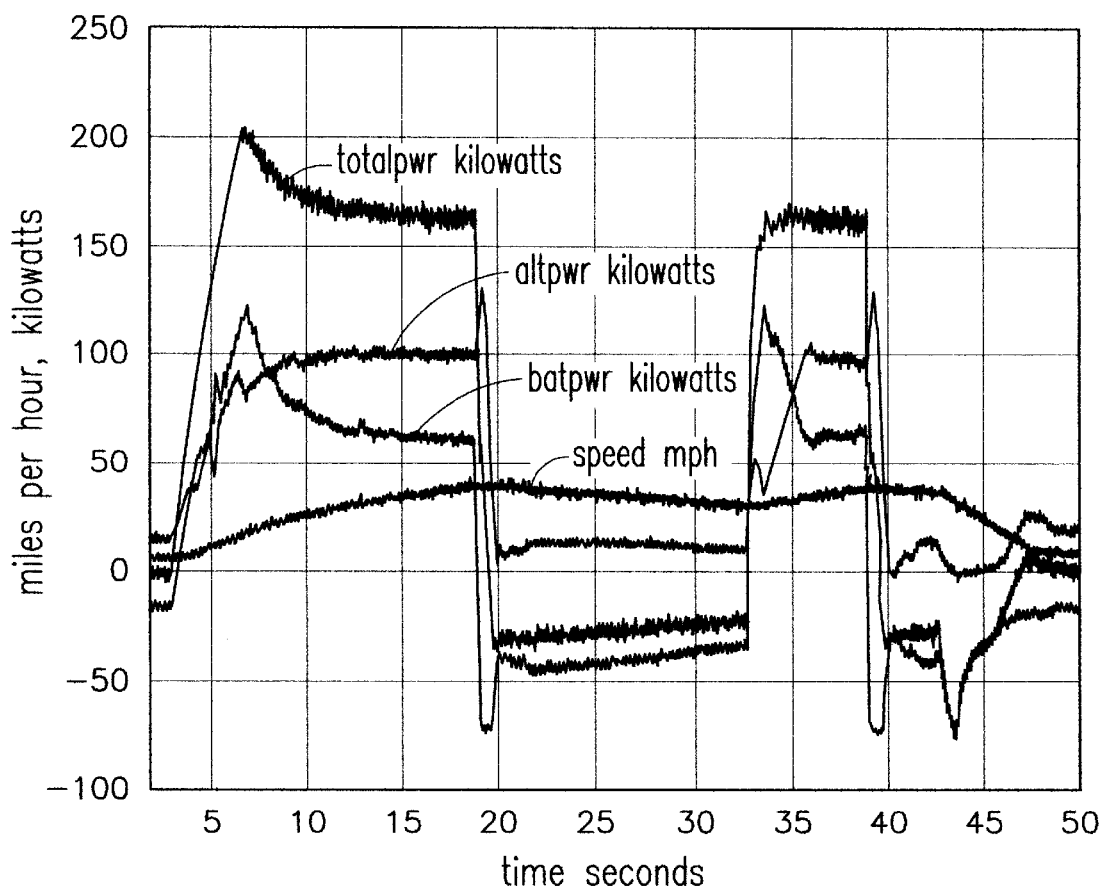
FIG. 2 shows signal waveforms obtained from an exemplary Diesel-based auxiliary power unit for illustrating some of the problems that are now overcome by the present invention.

The discussion that follows is made for the purpose of better appreciating one the problems solved by the present invention. FIG. 2 shows exemplary waveforms of power versus time of a diesel hybrid 40' transit bus, initially during a maximum effort acceleration from rest and approximately 32 seconds later in response to a maximum effort command while the vehicle is operating at approximately 30 mph. In the hybrid propulsion configuration that generated the waveforms of FIG. 2 there is an auxiliary power unit (APU) comprised of a diesel engine directly coupled to a 100 kW alternator with appropriate controls, and an energy storage unit comprised of a bank of traction batteries. The transient response of the diesel APU is purposely controlled to approximately 30 kW/second to minimize engine emissions. During the second acceleration in FIG. 2, the energy storage device (traction battery in this example) supplies a peak power of approximately 125 kW as the APU output power ramps to its rated power of 100 kW. The net effect is that the total power of the diesel APU plus the energy storage device is approximately 165 kW over the entire acceleration period of 6 seconds. As also shown in FIG. 2, the total transient power developed by the APU and energy storage device is 1.6 to 2 times the steady-state power of the APU. Also, during regenerative braking, the energy storage device sinks bursts of power that are nearly 70% of the rated APU power.

As suggested above, the power control system of the present invention enhances the benefits of the fuel cell stack, while solving the transient power response deficiencies that exist in presently-available reformer-based fuel cell systems. In addition, the power control system of the present invention allows for capturing regenerative energy when the load (e.g., any traction motor in the case of a vehicle) becomes a source rather than a sink of energy or power. It will now be appreciated by those skilled in the art that, in the series hybrid propulsion configuration described above, the standard fuel reformer/fuel cell system of FIG. 1 is analogous to the diesel APU (engine/generator). The power control system of the present invention provides the required transient response for mobile vehicle and transportation applications without the safety and infrastructure issues of hydrogen-based fuel cells.

It is noted that for purposes of brevity of description the present application focuses on an exemplary vehicular application. It will be appreciated, however, that the present invention is not limited to vehicular applications since the improved reformer-based fuel cell system of the present invention may now be used in residential or commercial power distribution applications, in uninterruptable power supplies application, in hoist machine applications, such as cranes, lifts, etc. Thus, it will be understood that the scope of the present invention is not limited to vehicular applications of a reformer-based fuel cell system.

Figure 3:
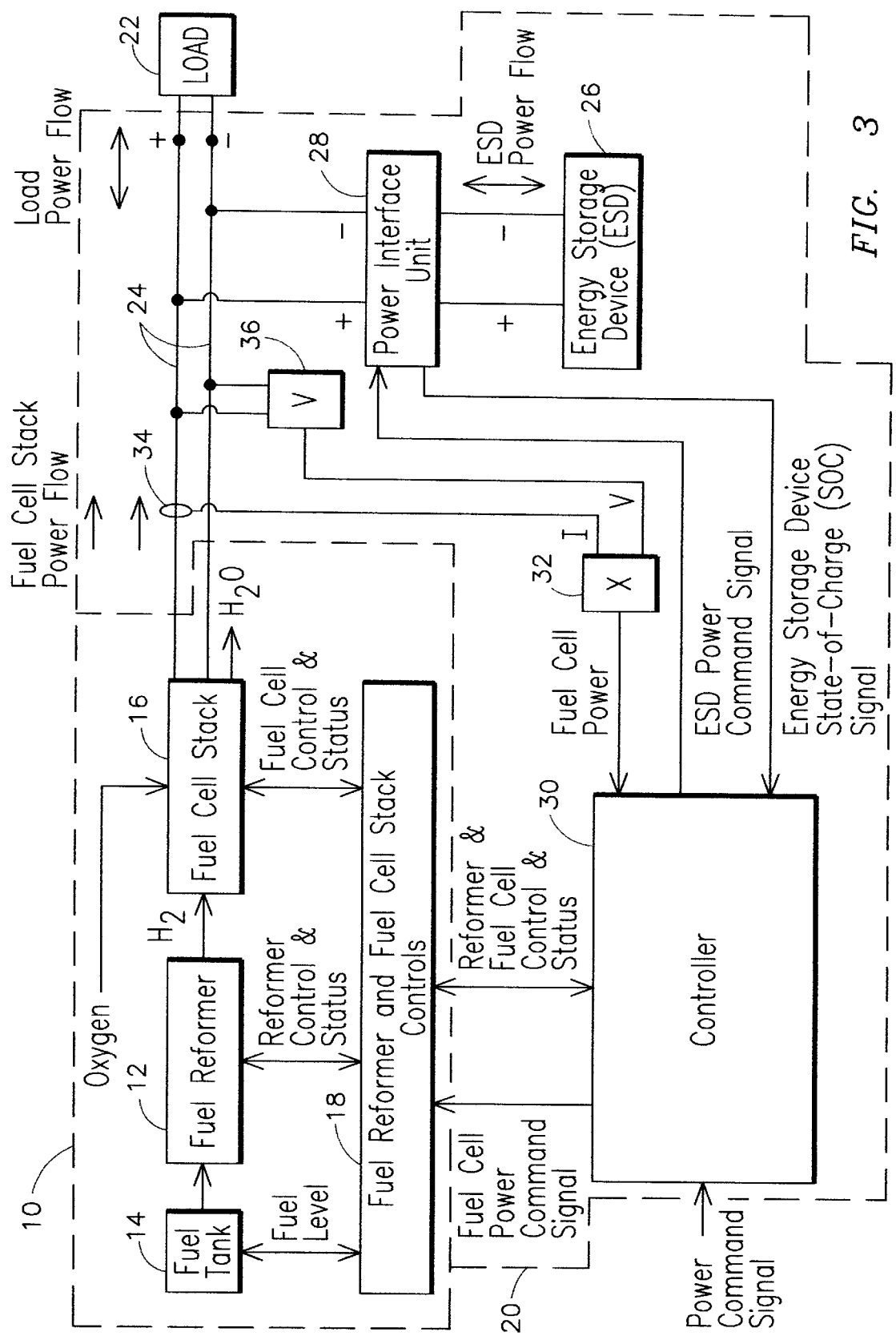
FIG. 3 is a block diagram schematic showing the reformer-based fuel cell system of FIG. 1 in combination with an exemplary embodiment of the power system of the present invention, which system uses a controller for managing power flow to/from an energy storage device.

FIG. 3 shows an exemplary embodiment of an auxiliary power system 20 in combination with the reformer-based fuel cell system (FCS) of FIG. 1. As discussed above in the context of FIG. 1, reformer-based fuel cell system 10 provides a unidirectional source of power. Further, reformer-based fuel cell system 10 is not capable of generating power sufficiently fast to meet the demands from a load 22 (e.g., one or more traction motor drives coupled to drive respective traction motor(s) in the case of a vehicular application) powered through a DC power bus 24. As shown in FIG. 3, an energy storage device (ESD) 26, that in a preferred embodiment may be comprised of an ultracapacitor, is coupled to the power bus 24 through an electronic power interface unit 28. An ultracapacitor may be desirable due to its relatively light weight and its ability to deliver relatively high bursts of electrical power, such as may be needed to compensate the sluggish transient response of the reformed-based fuel cell system 10. It will be appreciated, however, that the energy storage device 28 need not be limited to an ultracapacitor since other energy storage devices, such as batteries, flywheels, super-conducting magnetic electric storage devices, etc., could also be used in lieu of the ultracapacitor.

Power interface unit 28 allows to selectively pass power between the energy storage device 26 and the power bus in response to an ESD power command signal supplied to power interface unit 28 from a controller 30. One exemplary type of power interface unit that may be used is described in U.S. Pat. No. 5,903,449, which is assigned in common to the same assignee of the present invention and is herein incorporated by reference. By way of example, power interface device 28 may provide operation of the energy storage device in a closed-loop mode of operation so as determine the power level as well as the direction of the power passing from or into the energy storage device. Thus, the electronic power interface allows for closed-loop bi-directional power flow to the energy storage device, e.g., either charge or discharge of the ultracapacitor device. A computation of the fuel cell instantaneous output power may be obtained by multiplication of respective current and voltage measurements or signals in a multiplier 32 that receives measurements from respective current and voltage sensors 34 and 36.

During vehicle acceleration, and at least in response to an externally-derived power command signal from a vehicle system controller (not shown), the ESD power command signal may be computed in controller 30 using straight-forward and readily-understood feedback control loop techniques to those of ordinary skill in the art, such as proportional, integral, and derivative, (PID) control loop techniques. During vehicle deceleration, and at least in response to an externally-derived braking command signal from the vehicle system controller, the ESD power command signal supplied to power interface unit 28 will be adjusted to enable the energy storage device to capture power generated by the load 22. As will be discussed in the context of FIG. 4 below, respective power management modules or algorithms within controller 30 are provided to sustain a desired state-of-charge (SOC) in the energy storage device after partial depletion upon a vehicle acceleration. During vehicle deceleration, a portion of the regenerative energy from the load 22 (e.g., traction motor drive(s)) is captured in the energy storage device, thus further increasing the overall fuel economy when the auxiliary power system 20 is used in combination with fuel cell system 10 either in a mobile vehicle or other applications where overhauling loads are present.

It will be appreciated that the present invention may now afford substantial flexibility to the designer of the traction system of the vehicle. For example, it is believed that in order to compensate the shortcomings of the reformed-based fuel cell system, the designer is usually forced to choose a fuel cell system rated at a much higher value than the true steady-state needs of the vehicle. Unfortunately, such over-designing will generally result in a much more costly design which in many instances may only partially solve the transient response shortcomings of the fuel cell system. It will be appreciated that the auxiliary power system of the present invention will allow the designer to more accurately match the ratings of the fuel cell system to the true steady-state power needs of the vehicle and thus allows for a less expensive design.

Figure 4:
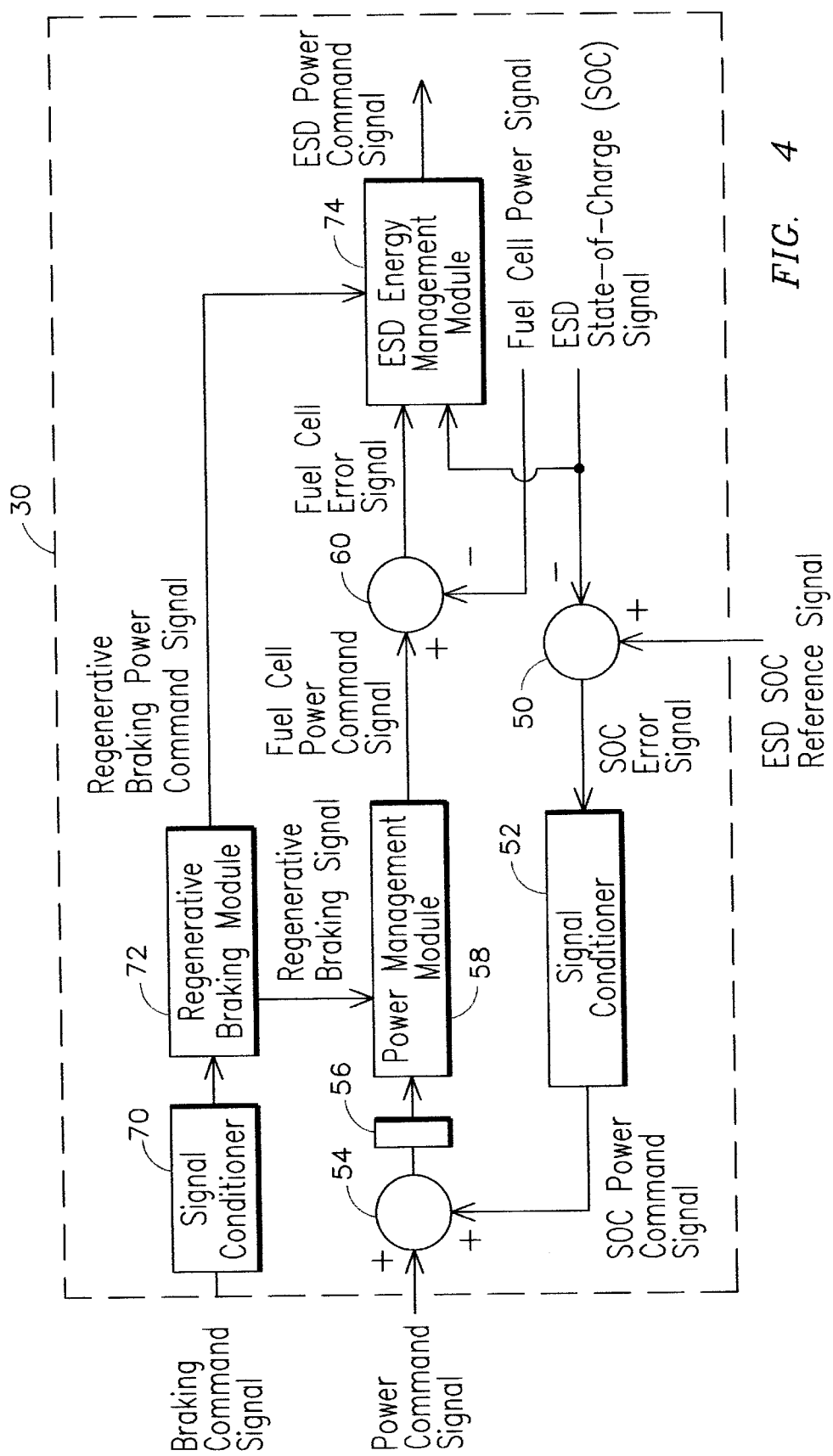
FIG. 4 is a block diagram illustrating further details regarding the controller of FIG. 3.

FIG. 4 is a block diagram representation of one exemplary embodiment of the controller 30 shown in FIG. 3 above. As shown in FIG. 4, controller 30 uses a comparator 50 to compare the state-of-charge (SOC) of the energy storage device 26 (FIG. 3) against a predetermined SOC reference signal so as to generate a SOC error signal. A signal conditioner 52 receives the SOC error signal to generate a SOC power command signal indicative of the power needed by the energy storage device 26 to maintain its state-of-charge at a level substantially corresponding to the level indicated by the predetermined SOC reference signal. As will be appreciated by those skilled in the art, signal conditioner 52 provides suitable signal limiting, filtering and gain adjusting and error signal using well-understood signal conditioning techniques. As suggested above, signal conditioner 52 supplies the SOC power command signal which is supplied to a summer 54 for combining with the externally-derived power command signal indicative of the power required by the load 22 (FIG. 3). Summer 54 supplies a combined power command signal that is indicative of both the power needs of the load as well as the power that may be needed to recharge the energy storage device. The combined power command signal is received by a signal conditioner 56 to produce a conditioned power command signal. Once again, using signal conditioning techniques well-understood to those of ordinary skill in the art, signal conditioner 56 provides suitable signal gain as well as suitable limits to the signal received combined power command signal.

As shown in FIG. 4, controller 30 includes a power management module 58 coupled to receive the conditioned power command signal from signal conditioner 56 and further coupled to receive a signal indicative of whether the vehicle is being operated in a regenerative braking mode of operation to generate a (FCS) power command signal. It will be appreciated that during periods when the vehicle is being operated in a regenerative power mode of operation, then the power management module 58 will adjust the (FCS) power command signal so that during those periods, the power which is generated by the fuel cell system will comprise a relatively small amount of power, as compared to the power which the fuel cell system will be commanded to produce during motoring periods of operation.

A comparator 60 is provided to compare the level of the (FCS) power command signal against the instantaneous power generated by the fuel cell system so as to generate a (FCS) error signal. A signal conditioner 70 receives the externally-derived braking command signal to generate a conditioned braking command signal. A regenerative braking module 72 receives the conditioned braking command signal to generate the signal indicative of whether the vehicle is operating in the regenerative mode of operation or not. The regenerative braking module 72 also generates a regenerative braking power command signal that may indicate the level of braking of the vehicle. For example, the regenerative braking power command signal may indicate how fast the vehicle is being commanded to deaccelerate since the more braking is applied to the vehicle, then the more regenerative power will be generated by the traction motor(s) of the vehicle. An energy management module 74 receives the (FCS) error signal, the regenerative braking power command signal and the state-of-charge signal to generate the ESD power command signal supplied to the power interface unit 28 (FIG. 3) so that when the vehicle operates in the regenerative braking mode of operation, power from the load is captured by the energy storage device. As suggested above, the energy storage device may also receive power once the fuel cell system has reached steady-state so as to replenish power which may have extracted from the energy storage device during transient conditions.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A control system for controlling power flow in a power bus generally powered by a reformer-based fuel cell system (FCS), the control system comprising:

an energy storage device (ESD);

a power interface unit coupled to selectively pass power bi-directionally between the energy storage device and the power bus in response to an ESD power command signal supplied to the power interface unit; and a controller coupled to the power bus to receive one or more signals indicative of the instantaneous power delivered by the fuel cell system and configured to generate the ESD power command signal so that the energy storage device may supply power to the power bus at least during transient conditions when the instantaneous power delivered by the fuel cell system is below a FCS power command signal.

2. The system of claim 1 wherein the controller has a comparator configured to compare a state-of-charge (SOC) of the energy storage device against a predetermined SOC reference signal so as to generate a SOC error signal.

3. The system of claim 2 wherein the controller has a signal conditioner that receives the SOC error signal to generate a SOC power command signal indicative of power needed by the energy storage device to maintain its state-of-charge at a level substantially corresponding to the level indicated by the predetermined SOC reference signal.

4. The system of claim 3 wherein the controller has a summer for combining an externally-derived power command signal indicative of power required by a load powered through the power bus, and the SOC power command signal to produce a combined power command signal.

5. The system of claim 4 wherein the load comprises one or more traction motors coupled to propel a vehicle.

6. The system of claim 4 wherein the load comprises one or more electric motors coupled to hoist objects.

7. The system of claim 4 wherein the load comprises a power distribution device.

8. The system of claim 5 wherein the controller has a signal conditioner that receives the combined power command signal to produce a conditioned power command signal.

9. The system of claim 8 wherein the controller includes a power management module coupled to receive the conditioned power command signal and further coupled to receive a signal indicative of whether the vehicle is being operated in a regenerative braking mode of operation, the power management module being configured to generate the FCS power command signal.

10. The system of claim 9 wherein the controller has a comparator configured to compare the FCS power command signal against the instantaneous power delivered by the fuel cell system to generate a FCS error signal.

11. The system of claim 10 wherein the controller has a signal conditioner for receiving an externally-derived braking command signal to generate a conditioned braking command signal.

12. The system of claim 11 wherein the controller has a regenerative braking module coupled to receive the conditioned braking command signal, the regenerative braking module configured to generate the signal indicative of whether the vehicle is operating in a regenerative mode of operation or not, the regenerative braking module further configured to generate a regenerative braking power command signal indicative of the level of braking of the vehicle.

13. The system of claim 12 wherein the controller has an energy management module coupled to receive the FCS error signal, the regenerative braking power command signal and the state-of-charge signal to generate the ESD power command signal supplied to the power interface unit so that, at least when the vehicle operates in the regenerative braking mode of operation, power from the load is captured by the energy storage device.

14. The system of claim 13 wherein the energy management module generating the ESD power command signal is further configured to direct at least a portion of power from the fuel cell system into the energy storage device to replenish any energy depleted from the energy storage device subsequent to any transient conditions.

15. The system of claim 1 wherein the energy storage device is selected from the group consisting of a capacitor, a flywheel, a battery or respective combinations thereof.

16. The system of claim 1 wherein the energy storage device comprises an ultracapacitor.

17. An auxiliary power system in combination with a reformer-based fuel cell system (FCS) for energizing a power bus coupled to one or more electric motor drives coupled to drive a load, the power system comprising:
   an energy storage device (ESD);
   a power interface unit coupled to selectively pass power bi-directionally between the energy storage device and the power bus in response to an ESD power command signal supplied to the power interface unit; and
   a controller coupled to the power bus to receive one or more signals indicative of the instantaneous power delivered by the fuel cell system and configured to generate the ESD power command signal so that the energy storage device may supply power to the power bus at least during transient conditions when the instantaneous power delivered by the fuel cell system drops below a FCS power command signal.

18. The system of claim 17 wherein the controller has a comparator configured to compare a state-of-charge (SOC) of the energy storage device against a predetermined SOC reference signal so as to generate a SOC error signal.

19. The system of claim 18 wherein the controller has a signal conditioner that receives the SOC error signal to generate a SOC power command signal indicative of power needed by the energy storage device to maintain its state-of-charge at a level substantially corresponding to the level indicated by the predetermined SOC reference signal.

20. The system of claim 19 wherein the controller has a summer for combining an eternally-derived power command signal indicative of power required by the electric motors powered through the power bus, and the SOC power command signal to produce a combined power command signal.

21. The system of claim 20 wherein the controller has a signal conditioner that receives the combined power command signal to produce a conditioned power command signal.

22. The system of claim 21 wherein the load driven by the electric motors comprises a vehicle.

23. The system of claim 17 wherein the load driven by the electric motors comprises a hoisting machine.

24. The system of claim 22 wherein the controller includes a power management module coupled to receive the conditioned power command signal and further coupled to receive a signal indicative of whether the vehicle is being operated in a regenerative braking mode of operation, the power management module configured to generate the FCS power command signal.

25. The system of claim 24 wherein the controller has a comparator configured to compare the FCS power command signal against the instantaneous power delivered by the fuel cell system to generate a FCS error signal.

26. The system of claim 25 wherein the controller has a signal conditioner for receiving an externally-derived braking command signal to generate a conditioned braking command signal.

27. The system of claim 26 wherein the controller has a regenerative braking module coupled to receive the conditioned braking command signal, the regenerative braking module configured to generate a signal indicative of whether the vehicle is operating in a regenerative mode of operation or not, the regenerative braking module further configured to generate a regenerative braking power command signal indicative of the level of braking of the vehicle.

28. The system of claim 27 wherein the controller has an energy management module coupled to receive the FCS error signal, the regenerative braking power command signal and the state-of-charge signal to generate the ESD power command signal supplied to the power interface unit so that, at least when the vehicle operates in the regenerative braking mode of operation, power from the motors is captured by the energy storage device.

29. The system of claim 28 wherein the energy management module generating the ESD power command signal is configured to direct at least a portion of power from the fuel cell system into the energy storage device to replenish any energy depleted from the energy storage device subsequent to any transient conditions.

30. The system of claim 17 wherein the energy storage device is selected from the group consisting of a capacitor, a flywheel, a battery, or any combination thereof.

31. The system of claim 17 wherein the energy storage device comprises an ultracapacitor.

32. A method for controlling power flow in a power bus generally powered by a reformer-based fuel cell system (FCS), the method comprising:

providing an energy storage device (ESD); selectively passing power bi-directionally between the energy storage device and the power bus in response to an ESD power command signal; and determining the instantaneous power delivered by the fuel cell system so that the energy storage device may supply power to the power bus at least during transient conditions when the instantaneous power delivered by the fuel cell system is below a FCS power command signal.

33. The method of claim 32 further comprising a comparing step for comparing a state-of-charge (SOC) of the energy storage device against a predetermined SOC reference signal so as to generate a SOC error signal.

34. The method of claim 33 further comprising a signal conditioning step for conditioning the SOC error signal to generate a SOC power command signal indicative of power needed by the energy storage device to maintain its state-of-charge at a level substantially corresponding to the level indicated by the predetermined SOC reference signal.

35. The method of claim 34 further comprising a combining step for combining an externally-derived power command signal indicative of power required by a load powered through the power bus, and the SOC power command signal to produce a combined power command signal.

36. The method of claim 35 wherein the load comprises one or more traction motors coupled to propel a vehicle.

37. The method of claim 35 wherein the load comprises one or more electric motors coupled to hoist objects.

38. The method of claim 35 wherein the load comprises a power distribution device.

39. The method of claim 35 further comprising a signal conditioning step for producing a conditioned power command signal.

40. The method of claim 39 further comprising respective receiving steps for receiving the conditioned power command signal and further receiving a signal indicative of whether the vehicle is being operated in a regenerative braking mode of operation to generate the FCS power command signal.

41. The method of claim 40 further comprising a comparing step for comparing the FCS power command signal against the instantaneous power delivered by the fuel cell system to generates a FCS error signal.

42. The method of claim 41 further comprising signal conditioning an externally-derived braking command signal to supply a conditioned braking command signal.

43. The method of claim 42 further comprising processing the conditioned braking command signal for generating the signal indicative of whether the vehicle is operating in a regenerative mode of operation or not, and further generating a regenerative braking power command signal indicative of the level of braking of the vehicle.

44. The method of claim 43 further comprising processing the FCS error signal, the regenerative braking power command signal and the state-of-charge signal to generate the ESD power command signal so that when the vehicle operates in the regenerative braking mode of operation power from the load is captured by the energy storage device.

45. The method of claim 44 wherein the ESD power command signal is set to direct at least portion of power from the fuel cell system into the energy storage device to replenish any energy depleted from the energy storage device subsequent to any transient conditions.

46. The method of claim 32 wherein the energy storage device is selected from the group consisting of a capacitor, a flywheel, a battery or respective combinations thereof.

47. The method of claim 32 wherein the energy storage device comprises an ultracapacitor.

* * * * *